United States Patent [19]

de Sivry et al.

[11] 4,443,129

[45] Apr. 17, 1984

[54] METHOD AND APPARATUS FOR TAPPING A SUBMERGED PIPE

[75] Inventors: Bruno de Sivry; Jean-Louis Migliarese-Caputi, both of Paris; Guy Hervé; Claude Colas, both of Nantes, all of France

[73] Assignee: Compagnie Francaise des Petrols, Paris, France

[21] Appl. No.: 294,641

[22] Filed: Aug. 20, 1981

[30] Foreign Application Priority Data

Aug. 22, 1980 [FR] France ................. 80 18328

[51] Int. Cl.³ ............................... F16L 1/00
[52] U.S. Cl. ...................... 405/170; 405/168; 405/169; 405/188
[58] Field of Search ............... 405/168–172, 405/188; 285/18, 24, 27

[56] References Cited

U.S. PATENT DOCUMENTS

| | | | |
|---|---|---|---|
| 3,204,417 | 9/1965 | Robley | 405/170 |
| 3,267,682 | 8/1966 | Robley | 405/170 |
| 3,578,233 | 5/1971 | Meister | 405/170 X |
| 3,785,160 | 1/1974 | Banjavich et al. | 405/170 |
| 4,076,130 | 2/1978 | Sumner | 405/170 X |
| 4,091,514 | 5/1978 | Motes-Conners et al. | 405/170 X |

Primary Examiner—Dennis L. Taylor
Attorney, Agent, or Firm—Sughrue, Mion, Zinn, Macpeak, and Seas

[57] ABSTRACT

A process for tapping a region of a pipe placed on a sea bed utilizes a working platform which is installed vertically above the region of the pipe to be tapped, the platform being adapted to receive a support girder which can be lowered from the surface of the sea onto the working platform and be engaged therewith and then lifted off the platform. The platform is adapted to receive successively a plurality of modular tool-carriers provided with tools for carrying out a variety of operations on the pipe, the operations including concrete stripping, removal of anti-corrosion covering, transverse cutting, internal brushing, and making the longitudinal weld flush. During the process, various of the operations are successively carried out on the pipe by the tool-carriers which are mounted successively on the support girder, each operation being separated from the next by raising the support girder to the surface, replacing the tool-carrier at the surface by a new tool-carrier to be used in the next operation, and by lowering the girder with the new tool-carrier onto the working platform.

25 Claims, 16 Drawing Figures

METHOD AND APPARATUS FOR TAPPING A SUBMERGED PIPE

BACKGROUND OF THE INVENTION

The invention relates to a process and a device for tapping a submerged pipe, for example a pipe for conveying petroleum products. The tapping operation may be for the purpose of attaching a branch pipe to a main pipe or in of replacing a damaged pipe section. In the latter case, the connection of a new section to pipe ends can be carried out in accordance with various known joining processes, in particular by welding under normal pressure or under excess pressure, by bonding or by mechanical connection, and the invention essentially concerns the preparatory stage of the actual connection, that is to say to the preparation of the pipe ends which will remain after removal of the section to be replaced.

It is known to carry out various kinds of underwater work using divers equipped with hand tools. This procedure involves many risks and is not suitable if the pipe is at a depth inaccessible by divers. It has been proposed to use a submarine vehicle which has all the tools and operating means required for the various operations permitting the replacement of a pipe section, which, equipped with feet for resting on the sea bed, settles above the tapping point, and which is linked to the surface by an umbilical cable. A vehicle of this type has a very complicated design, does not easily adapt to different conditions of use and becomes immobilised by the breakdown of only one of its many devices.

It has also been proposed to mount girders on the pipe by means of clamping rings so that a support can move on the girders. The support is equipped with a plurality of various remote-controlled tools designed to perform the necessary operations. However, it is difficult to mount these various tools, on the single support, and oftentimes it is impossible in operating all these various tools to obtain the best working conditions and sufficient speed. Moreover, in the case of a pipe covered with concrete, mounting the girders to a pipe presupposes that the pipe has been stripped of concrete beforehand, and this method therefore excludes the concrete-stripping operation from the operations carried out according to the method.

SUMMARY OF THE INVENTION

The present invention proposes to carry out, under excellent conditions, if appropriate with remote control, a large number of underwater operations and, in particular, all those required removing damaged pipe section and for preparing ends of a submerged pipe which remain after the damaged section has been removed, by using modular elements which make it possible rapidly to attend to any breakdown of the equipment and provide a high degree of flexibility in use.

According to one aspect of the invention there is provided a process for tapping a region, referred to as a tapping region, of a pipe placed on a sea bed, in which process the pipe is engaged by at least one raising means, (a lifting device) which engages the portion of pipe located below it and enables displacement of it transversely in vertical and horizontal directions. Subsequently a working platform is installed vertically above the tapping region, the platform being capable of receiving a support girder which carries tools and which can be lowered onto the working platform and lifted off the platform. After desired operations are carried out with these tools, the support girder is removed from the pipe. Support girder is intended for successively receiving various modular tool-carriers each for carrying out, on the pipe, operations which include the following: concrete stripping, removal of anti-corrosion covering, transverse cutting, internal brushing and making the longitudinal weld flush. Various ones of these are carried out successively on the pipe with the aid of the modular tool-carriers mounted successively on the support girder, which is itself placed on the working platform, each operation being separated from the next by raising the support girder to the surface, together with the tool-carrier which has just been used, by replacing this tool-carrier on this support girder at the surface by a new tool-carrier to be used in the next operation, and by lowering the support girder onto the working platform, together with this new tool-carrier.

The invention also includes a tapping process which is particularly suitable for the preparation of ends of a pipe which remain after a section thereof has been removed from the sea bed, so that a new pipe section can later be secured to these pipe ends, according to this process two preliminary cuts are made which are closer together than the final cuts, and the pipe is thus divided into two portions each terminating in a temporary end. Next a raising means is installed on the sea bed vertically above at least a first of these two portions of pipe, a working platform is installed on the sea bed vertically above the temporary end of this first portion of pipe, the platform being adapted for receiving a support girder which is itself intended to be able to receive successively various modular tool-carriers each allocated for carrying out operations for preparing the portions of the pipe so they can be secured to the new pipe section, these operations including the final transverse cut. These operations are carried out successively on this first portion of pipe with the aid of these modular tool-carriers successively mounted on the girder, which is itself placed on the platform, each operation being separated from the next by raising the support girder to the surface, together with the tool-carrier which has just been used, by replacing this tool-carrier on this girder at the surface by a new tool-carrier to be used in the next operation, and by lowering the support girder onto the platform, together with this new tool-carrier. Subsequently, the working platform is displaced to bring it vertically above the temporary end of the second portion of pipe, which has been engaged by raising means, and these same operations are carried out successively on this second portion of pipe, in the same manner as for the first portion of pipe.

Advantageously, in this process, an ovalisation measurement is carried out on the pipe in order to determine the locations of the pipe which are oval-shaped so as to determine the location of the preliminary cuts. The preliminary cuts are made by means of rings of hollow explosive charges, and the location of the final cuts is then determined by means of an additional measurement to determine where the pipe is circular as opposed to oval-shaped in order to determine the location of the working platform.

The operations prior to the installation of the working platform, in particular these two operations which include the ovalisation measurement and the preliminary cutting, are preferably carried out by means of a light tapping device which is capable of moving between the water surface and the sea bed and of carrying out various operations. This tapping device can be, in particular, of the type consisting of a submarine vehicle, a remote-controlled device or a capstan linked to the surface by an umbilical cable. It may effect the handling, the supply and the control of an ovalisation-measuring module and a preliminary cutting module. It may possess, in particular, film cameras, a gripping arm and a re-tapping connecter.

This tapping device is advantageously also used in supplying and controlling the raising means, in controlling clamps for gripping pipe sections, in buoying and reconnaissance operations and in emergency operations in the event of breakdown of certain devices, in particular on the working platform.

The working platform, the support girder, the raising means and the gripping clamps, together with the pipe sections which they carry, constitute heavy elements which are handled by means of a lifting beam equipped with its own orientation means, and this lifting beam is also involved in supplying and controlling these heavy elements. According to another characteristic of the invention, this lifting beam is of the type having a carrying cable, which takes up its weight, and having its own orientation means and positioning system.

The operations of the preparation of a portion of pipe, which are carried out after positioning the working platform, advantageously comprise removal of the anti-corrosion covering, final transverse cutting, with fettling, and internal brushing.

If the pipe is covered with concrete, the operations listed in the above paragraph are preceded by a concrete-stripping operation. If the pipe possesses a longitudinal weld, these operations are followed by an operation for making the longitudinal weld of the portion of pipe flush on the outside and/or inside.

According to another aspect of the invention there is provided an apparatus for carrying out the process defined above, which comprises: at least one raising means comprising means for resting on the ground, means for engaging a pipe and means for the vertical displacement and horizontal displacement of the pipe engaging means; a working platform comprising means for resting on the ground; means for engaging a pipe; and means for receiving a support girder, the support girder being adapted to be received on the platform and being adapted to be locked thereto, the receiving means including handling and control means for displacing the receiving means between the surface and the sea bed, wherein the support girder is provided in its lower part with means for receiving one of a plurality of tool-carriers, and in that these tool-carriers each carry the tools required to carry out an operation taken from among the following operations: concrete stripping, removal of anti-corrosion covering, transverse cutting, internal brushing and making the longitudinal weld flush, and are equipped with means for removable attachment to the support girder.

The working platform may be provided, with feet of adjustable height and with a system for lateral or vertical alignment which is capable of aligning the pipe, the height adjustment of the feet being sufficient to enable some of the feet to pass over the pipe by sliding, while the other feet remain on the sea bed.

In its lower part, the platform advantageously forms a protective cage for protecting the modular tool-carriers which are mounted on the girder, which cage extends vertically and opens at the centre of its lower part, by virtue of a retractable system, to allow a portion of pipe to pass there through.

The platform and the girder are preferably equipped at their longitudinal ends with reciprocal connecting means which are such that they form a ball-and-socket system at one end and a vertically and horizontally adjustable guide at the other end, and also with means for locking these connecting means.

The platform advantageously possesses the means for engaging a pipe, vertically above the connecting means forming a ball-and-socket system, while the girder also comprises means for engaging a pipe, which means are located near the other longitudinal end.

In an advantageous embodiment, the girder comprises a longitudinal rolling track on which a carriage can move which is equipped in its lower part with means for receiving modular tool-carriers, and at least some of the tool-carriers include a cage in which several tools of the same type are mounted, and which is itself caused to rotate about a sector corresponding to the division of a circumference by the number of tools mounted. This rotation is preferably caused by a jack and a rack.

Preferably, the cage is guided in a rigid manner in the tool-carrier, while the tools are mounted to float in the cage.

BRIEF DESCRIPTION OF THE DRAWINGS

Further advantages and features of the invention will become apparent from the following description of an embodiment of the invention, given by way of example only, with reference to the accompanying grawings, in which:

FIGS. 13 to 16 show views, on a large scale, of a tool-carrier,

FIG. 15 being an end view and

DESCRIPTION OF THE PREFERRED EMBODIMENTS

Figure 1:
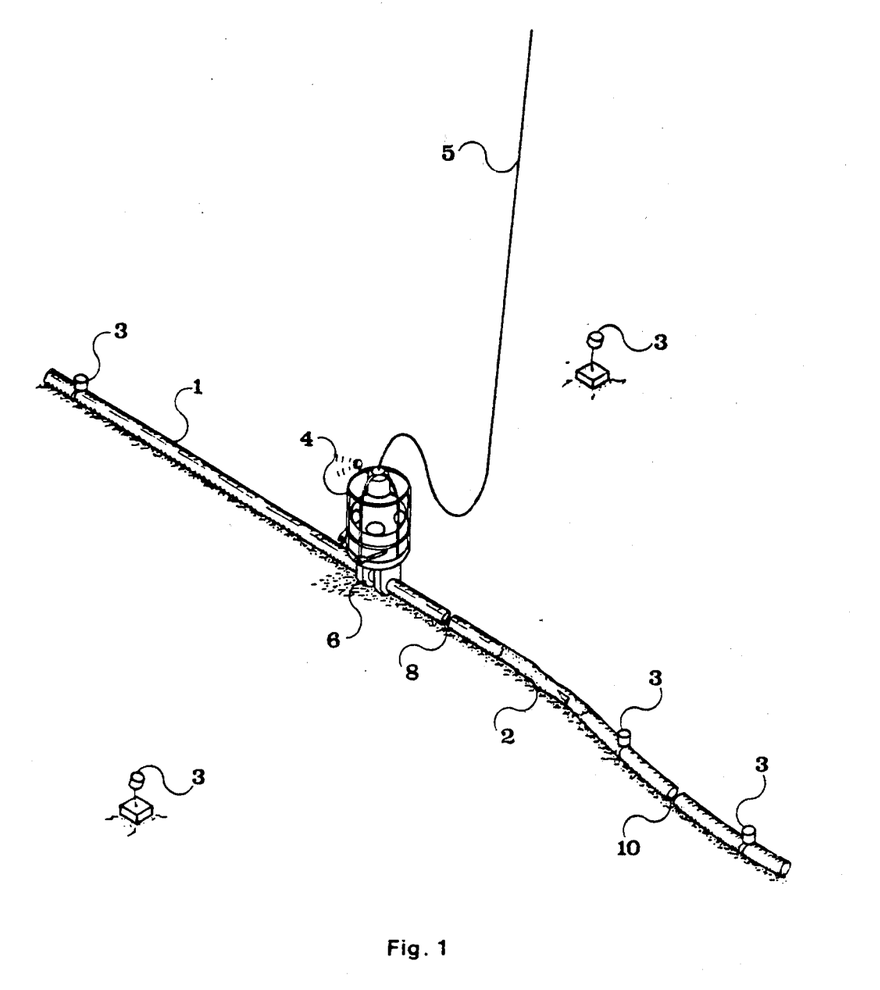
FIG. 1 shows a submerged pipe after preliminary transverse cuts have been made.

FIG. 1 illustrates a pipe 1 having damaged zone 2. Internal blanking devices (not shown) are received in the pipe 1, and the pipe 1 between the blanking devices and zone 2 are filled with water. The pipe 1, in the vicinity of the zone 2, is buoyed by the installation of acoustic buoys 3. These buoys 3 are installed with the aid of a light tapping device 4 linked to the surface, if appropriate, by an umbilical cable 5. Rings of explosive charges (not shown) are also installed around the pipe 1 on both sides of the damaged zone 2 using the tapping device 4. The rings of explosive charges make it possible to make coarse preliminary transverse cuts in the pipe 1.

The coarse preliminary transverse cuts divide the pipe 1 into a first portion 7 (FIG. 3) terminating in a temporary end 8, into a second portion 9 terminating in another temporary end 10, and into a section 11 to be removed.

FIG. 1 shows the tapping device 4 connected to an ovalisation-measuring apparatus 6 which detects circular pipe regions and which is used to determine the locations of the preliminary transverse cuts and the final transverse cuts along the pipe, and the location of these cuts determines the location of the working platform.

Figure 2:
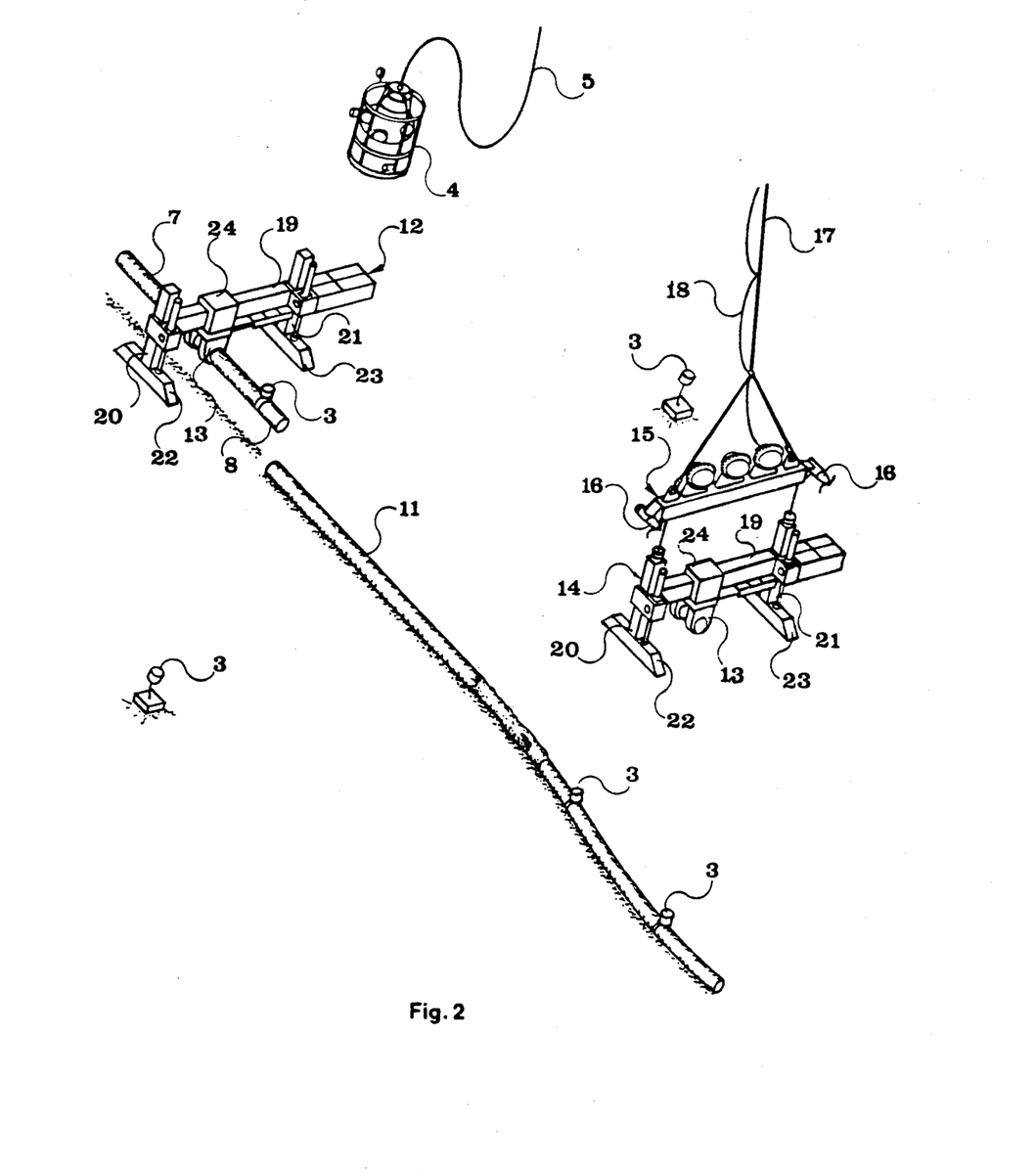
FIG. 2 shows this pipe during the positioning of the raising means.

FIG. 2 shows a first lifting device 12 having engaging jaws 13 postioned and engaged, with a first portion 7 (FIG. 3) of the pipe 1 on one side of the zone 2 at a location which is at a distance of, for example, several tens of meters from the end 8.

A second lifting device 14 is positioned on a second portion 9 of the pipe 1 on an opposite side of the zone 2. The second lifting device 14 is transported by a lifting beam 15 equipped with orientation propellers 16 and linked to the surface by a carrying cable 17 and an electric cable 18, it being possible, if appropriate, for these two cables to be combined in a single cable. This lifting beam possesses a navigation system and cameras.

Alternatively, it is possible for this second lifting device to be positioned subsequent to carrying out the operational stages of the preparation of the first pipe portion. It that case, the first lifting device could be used to raise the second portion of pipe and would be displaced from the first and the second pipe portions 7, 9 when the working platform is displaced.

Figure 3:
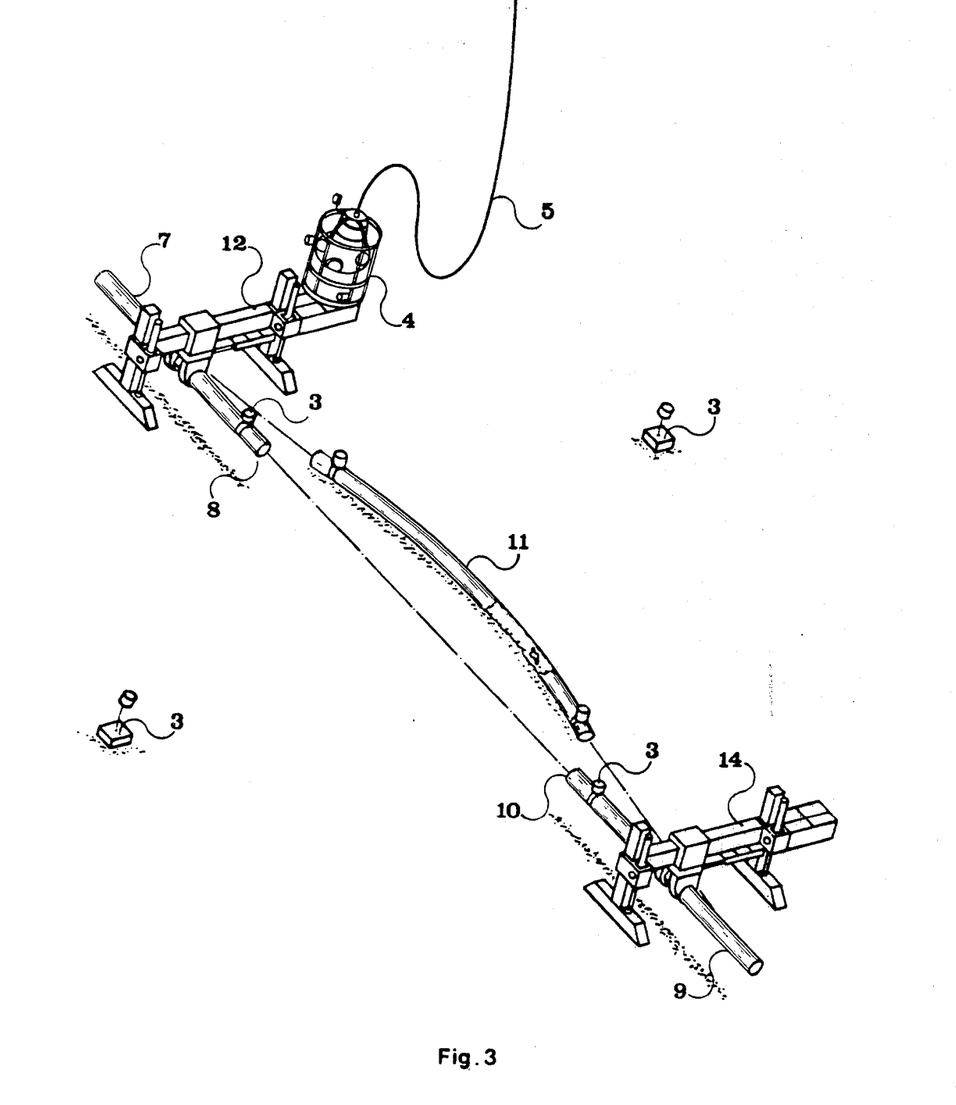
FIG. 3 shows this pipe during an operation for the pre-alignment of two portions of pipe.

Each lifting device 12 and 14 comprises a girder 19, the height of which can be adjusted by sliding it along two columns 20, 21 resting on feet 22, 23, and a carriage 24 which slides along the girder 19 and carries the jaws 13. They are positioned transversely to the portion of pipe 7, 9 in question and straddle it. These lifting devices are controlled in this case by the tapping device 4 which is fixed to the lifting device to be controlled, as illustrated in FIG. 3, in which an operation for the pre-alignment of the ends 8, 10 of the portions of pipe 7 and 9 is underway. They could also be controlled by the lifting beam 15.

Figure 4:
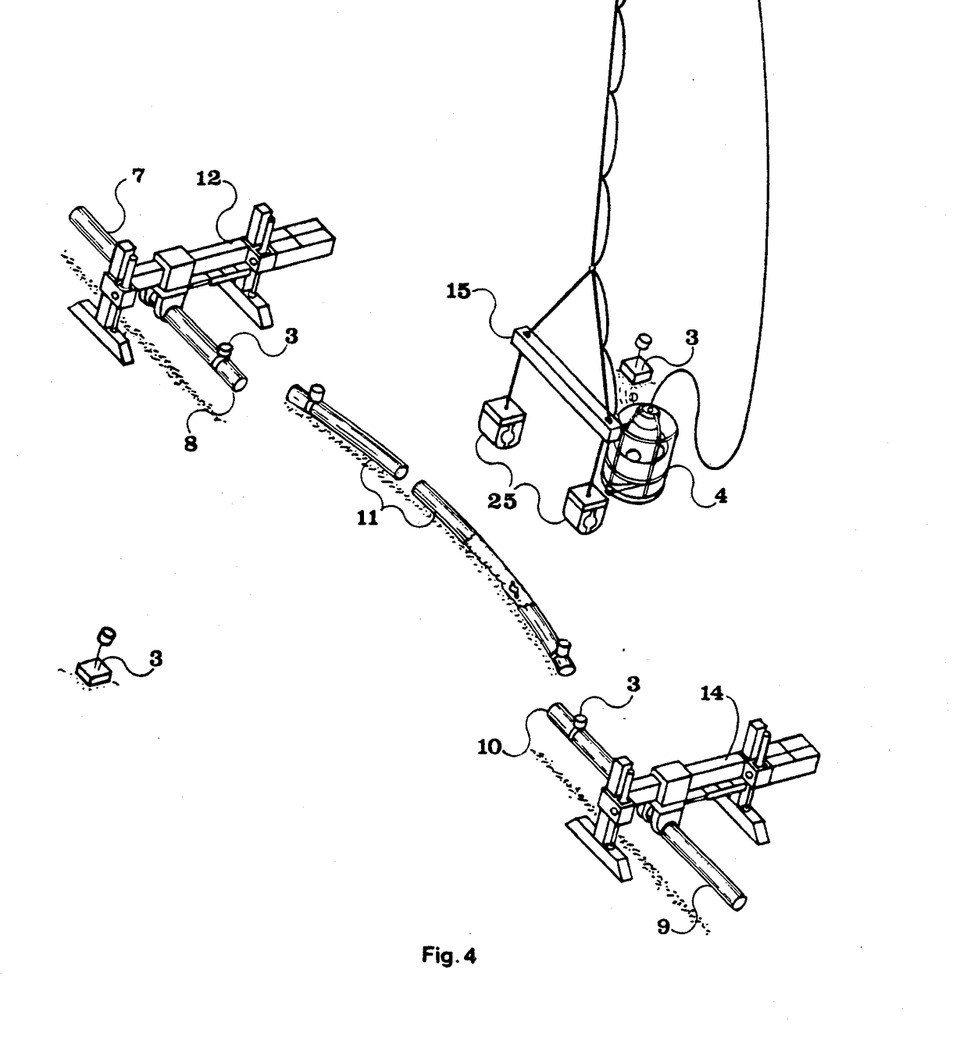
FIG. 4 shows this pipe during the lowering of a device for gripping and removing a pipe section separated by the preliminary cuts.

FIG. 4 illustrates an operation for removing the section or sections 11 required to be removed after they have been severed from the portion of pipe 7, 9. Two clamps 25, suitable for gripping the pipe, are mounted on the lifting beam 15, and the tapping device 4 is fixed to the lifting beam 15 in order to control the operation of these clamps 25, it also being possible for this operation to be controlled by the lifting beam 15. In FIG. 4, the assembly comprising the lifting beam 15 and the tapping device 4 is in the process of being lowered so that the clamps 25 can subsequently engage a section 11 of the pipe 1 to be removed so that the lifting beam 15 and the section 11 can be raised to the surface.

Figure 5:
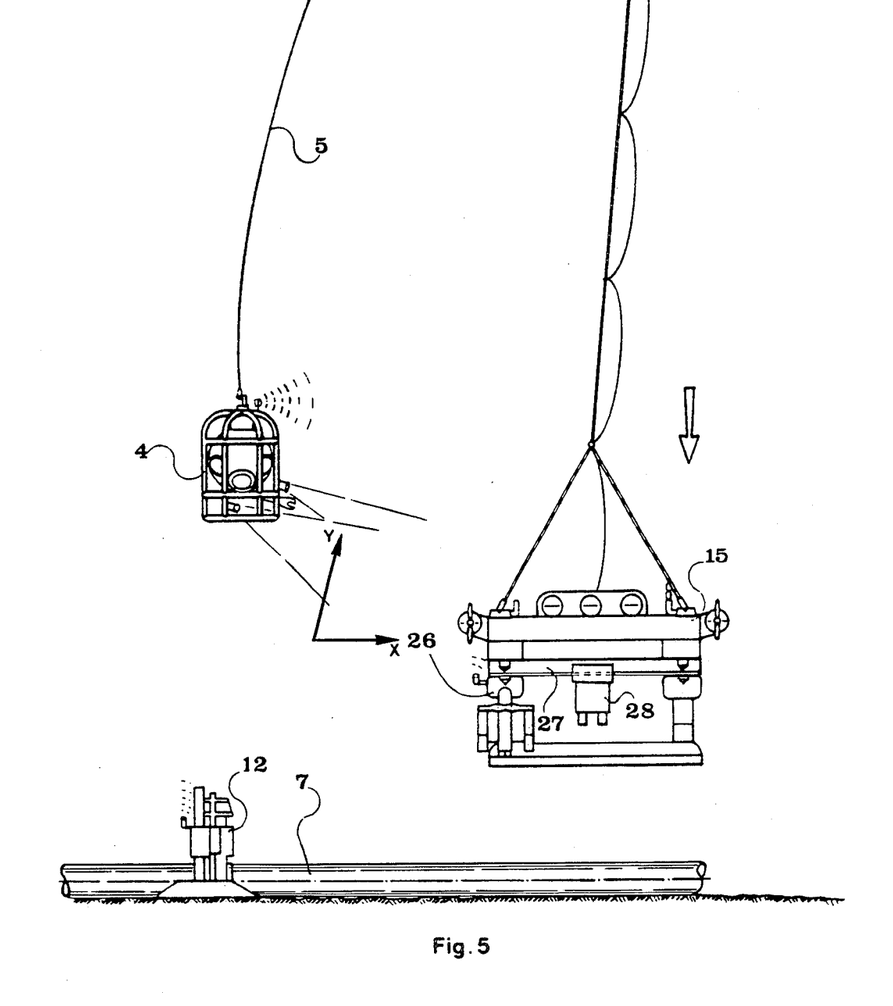
FIG. 5 shows a portion of pipe during the lowering of a working platform.

The next operation comprises positioning the working platform 26, the structure of which is described in detail later by reference to FIGS. 9–12. The working platform 26 is lowered onto the sea bed with the aid of the lifting beam 15. In practice, as shown in FIG. 5, a support girder 27 is fixed to the platform 26 and a tool-carrier 28 suitable for carrying out a first operational stage after installation of the platform 26 (for example stripping the pipe of concrete) is mounted on the support girder 27, and both the support girder 27 and the tool-carrier28 are lowered at the same time as the working platform 26.

The concrete stripping can be carried out by means of three tools working simultaneously in circumferential and longitudinal directions to cut out shells of concrete which extend over a predetermined length, and the shells of concrete are then detached by clearing means.

Figure 6:
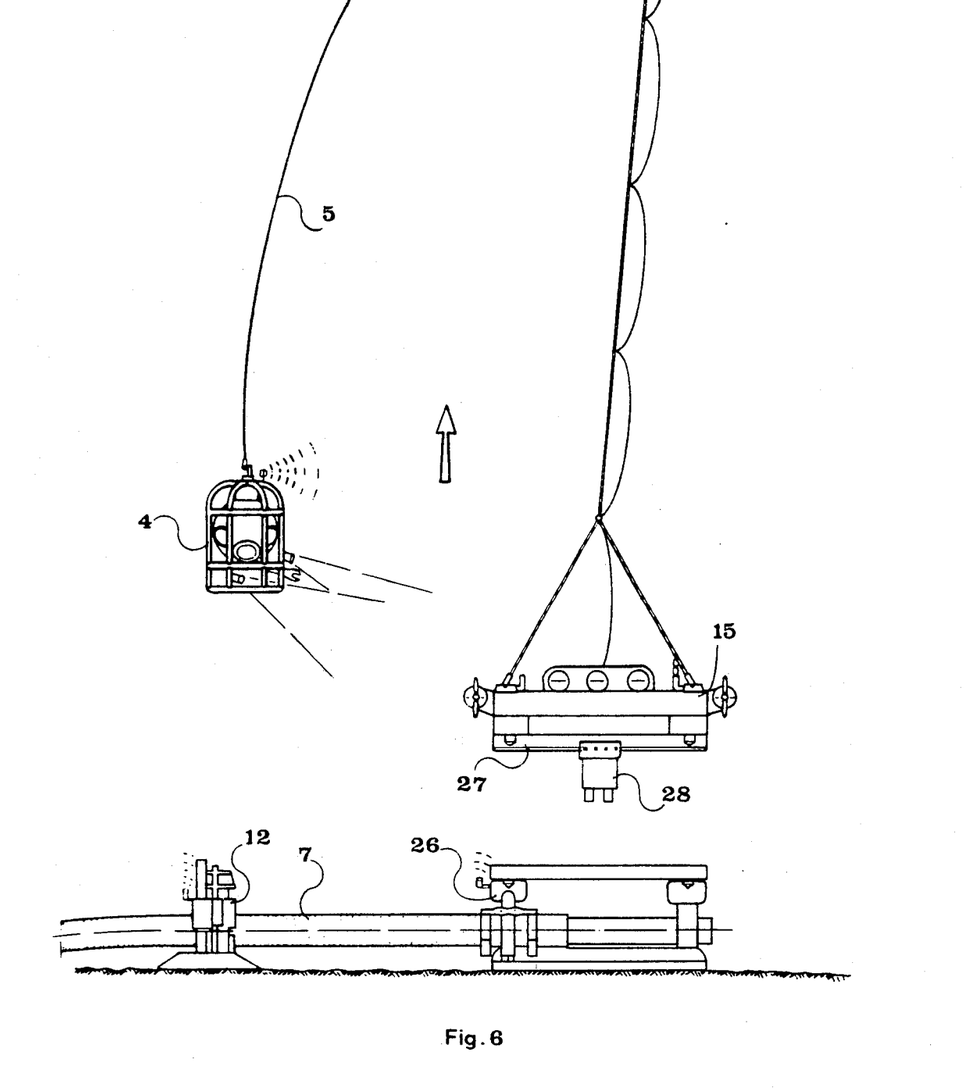
FIG. 6 shows this portion of pipe during the raising of a support girder together with a tool-carrier.
Figure 7:
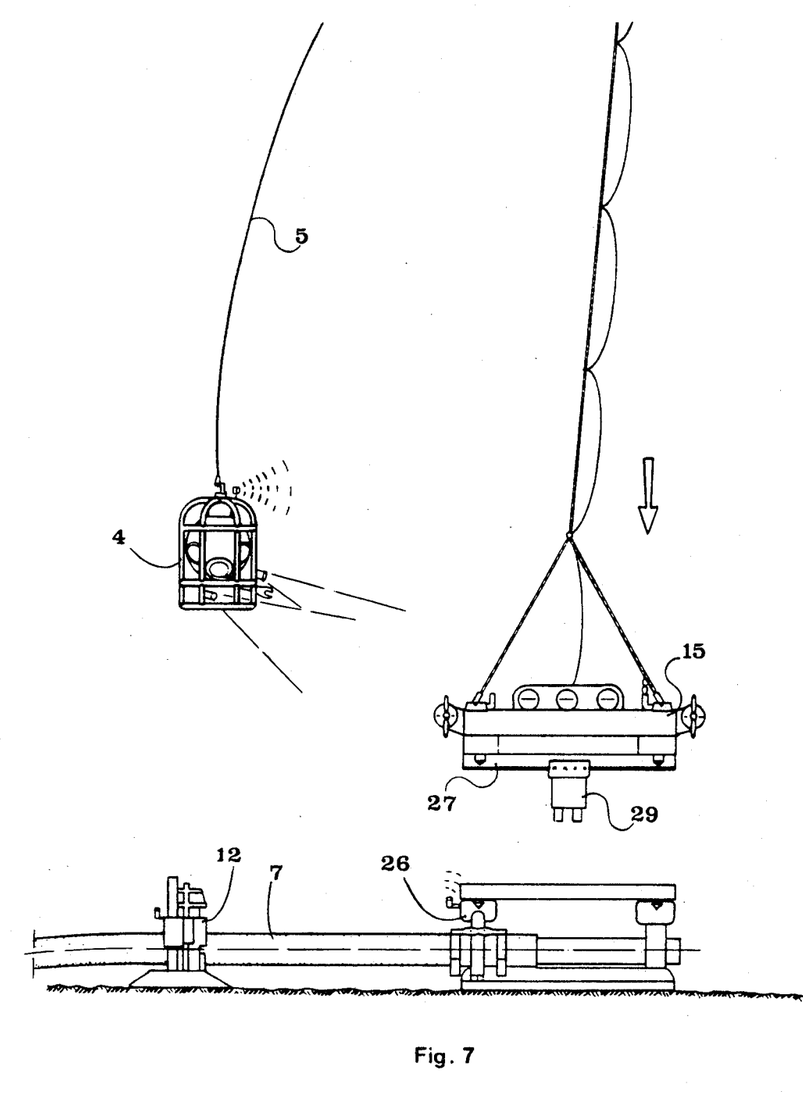
FIG. 7 shows this portion of pipe during the lowering of the support girder together with a new tool-carrier.

The lifting beam 15 (FIG. 6) is used to raise the girder 27 to the surface, together with the tool-carrier 28, and, at the surface, the tool-carrier 28 is replaced by the tool-carrier 29 suitable for carrying out a second operational stage (for example stripping an anti-corrosion covering from the pipe 1). The anti-corrosion covering can be removed by externally brushing the pipe portion 7. The girder 27 and the tool-carrier 29 are then lowered onto the platform 26 by the lifting beam 15, as shown in FIG. 7.

The external brushing is carried out by three rotary brushes working simultaneously and each allocated to an approximately 120° sector of the pipe, a longitudinal translational movement of the tool-carrier making it possible to sweep across the whole external surface of a predetermined length of the pipe portion 7.

When this second operation is complete, the girder 27 and the tool-carrier 29 are raised to the surface by means of the lifting beam 15, and a new tool-carrier suitable for carrying out a subsequent operational stage (for example making the final cut 30 in the pipe portion 7 (shown in FIG. 8) and fettling this cut) is mounted on the girder 27 (if appropriate, this new tool-carrier also possesses a clamp for recovering the small cut section). The same procedure is followed for the other subsequent operations such as internal brushing over a predetermined pipe length and making the longitudinal weld of the pipe portion 7 flush after which the girder 27 and the last tool-carrier used are raised to the surface.

The working platform 26 is then displaced by means of the lifting beam 15 to bring it in a position at right angles to the end of the second portion of pipe 9. The girder 27 is then lowered onto the working platform 26, together with the tool-carrier 28 corresponding to the first operation, and the same sequence of mounting, changing the tool-carrier, lowering and working is then carried out as for the first portion of pipe 7.

When all the operations pertaining to the second portion of pipe 9 have been carried out, the assembly comprising the working platform 26, the girder 27 and the last tool-carrier used is raised to the surface by means of the lifting beam 15. The portions of pipe 7 and 9 are then in the conditions shown in FIG. 8, the portion of pipe 9 terminating in a final cut 31, like the cut 30 of the portion of pipe 7, and being supported by the lifting device 14 in the position shown in broken lines on the right-hand side of the figure. The distance 30-31 is measured very precisely with the aid of metrology instruments.

Figure 8:
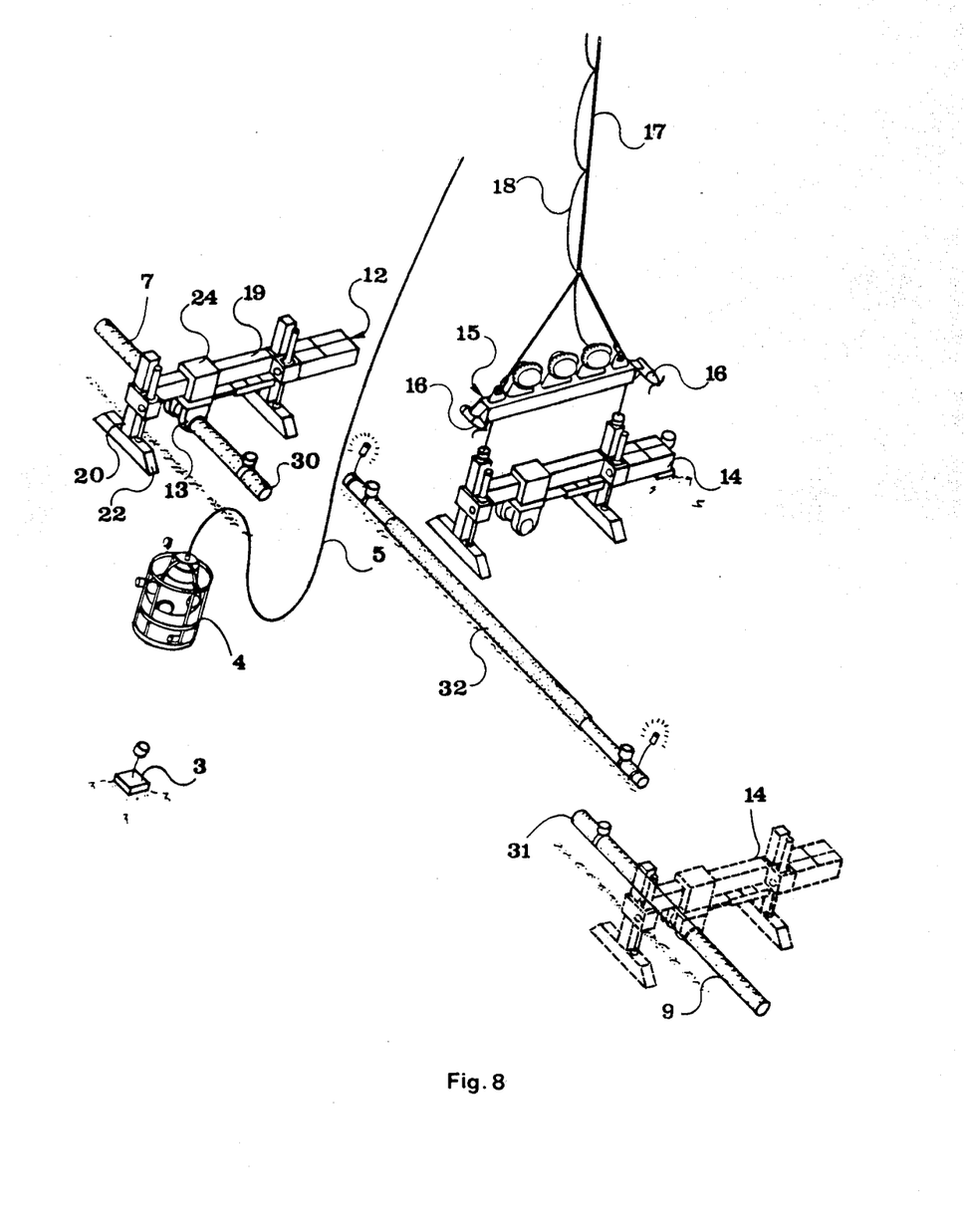
FIG. 8 shows the entire tapping region after the lowering of a new pipe section and during the installation of a raising means on the latter.

A new pipe section 32 of the desired length, which is intended to replace the section 11 which has been removed after making the coarse cuts and the final cuts, can then be lowered onto the sea bed by means of the lifting beam 15. The lifting device 14 is then displaced by means of the lifting beam 15 to bring it above the new section 32. The lifting device 14 is then controlled so as to align the section 32 and the end of the portion of pipe 7 and so as to be able to join them together. After this, one of the lifting devices, for example lifting device 14, is displaced in order to cause it to engage the portion of pipe 9, and at least one of the lifting devices is controlled in order to align the section 32 and the end of the pipe 9 so as to be able to join them together.

The lifting beam 15 possesses a hydraulic power unit (not shown) which is used to propel it and also to supply and control the tool-carriers carried by the lifting beam, the latter receiving commands in electrical form, from the surface, and converting them to hydraulic parameters. In its lower part, this lifting beam possesses a connector 33, shown in FIG. 9, which cooperates with the girder 27, and which permits connection to the elements carried by the lifting beam, in particular to the support girder.

The working platform 26 and the support girder 27 will not be described in greater detail with reference to FIGS. 9 to 12.

The working platform 26 comprises a frame 34 supported by feet 35 whose heights are adjustable, the feet being equipped with shoes 36, a system for lateral alignment 37 between the platform and the pipe, guides 38 ensuring rough guiding of the support girder 27 when it comes into position on the platform, a clamp 39 located at an upstream longitudinal end of the platform for engaging a portion of pipe, and an upstream guide 40 and a downstream guide 41 for ensuring precise guiding of the support girder 27.

The adjustable feet 35 make it possible to straddle the portion of pipe, for example portion 7, by the platform, while initially bringing the platform onto the sea bed next to the portion of pipe 7. In fact, it suffices to lift the feet 35 located on that side of the platform which is close to the portion of pipe (right-hand part of FIG. 11) in order to slide the platform, the weight of which is then supported essentially by the lifting beam, towards the portion of pipe until the system for lateral alignment 37 makes contact with the latter. The feet 35 which had been lifted are then lowered in order to bring their shoes 36 into contact with the sea bed.

Figure 9:
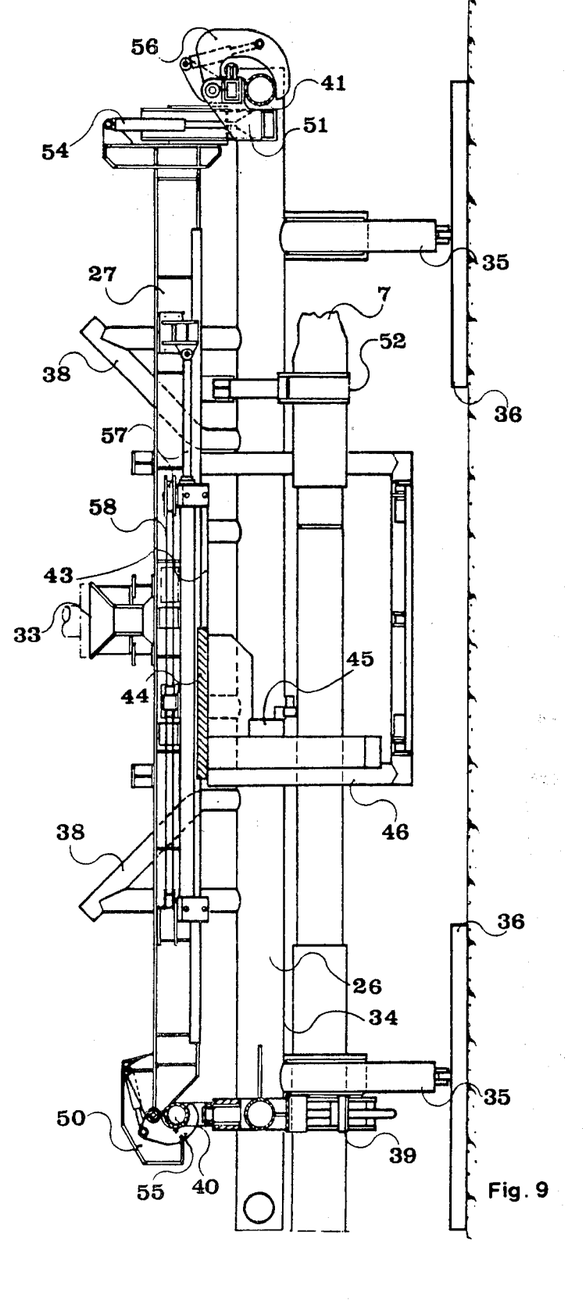
FIG. 9 shows, on a large scale, a view in elevation of the assembly comprising an end of a portion of pipe, a working platform and a support girder.
Figure 10:
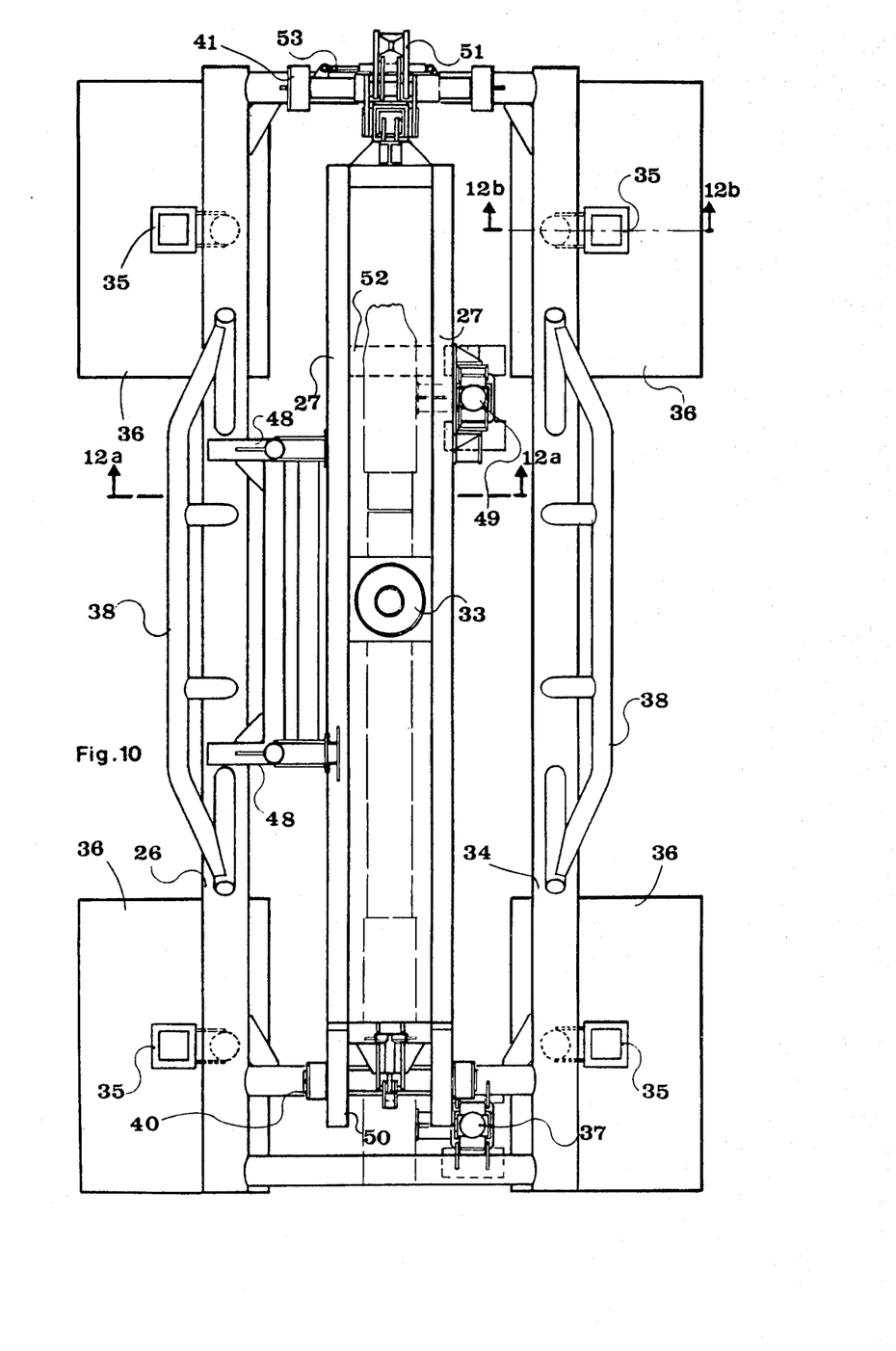
FIG. 10 shows a plan view of the assembly of FIG. 9.
Figure 11:
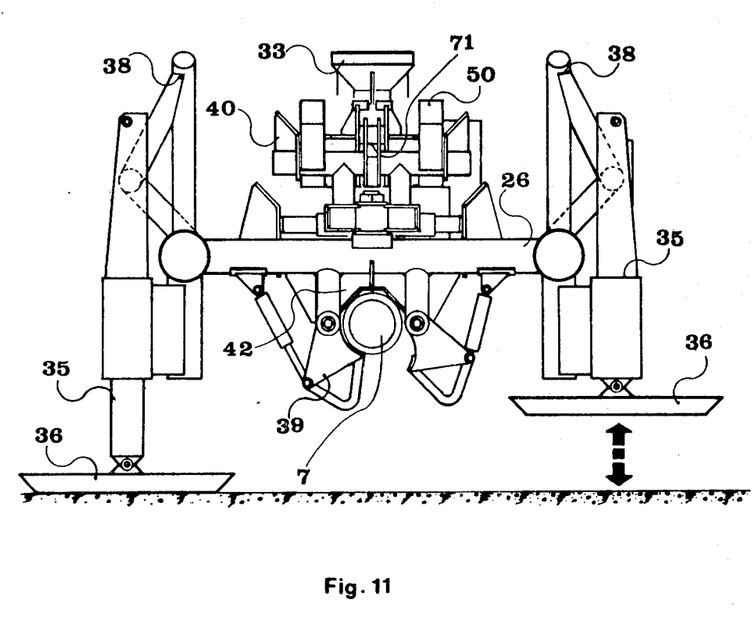
FIG. 11 shows an end view from the left of the assembly of FIG. 9.
Figure 12:
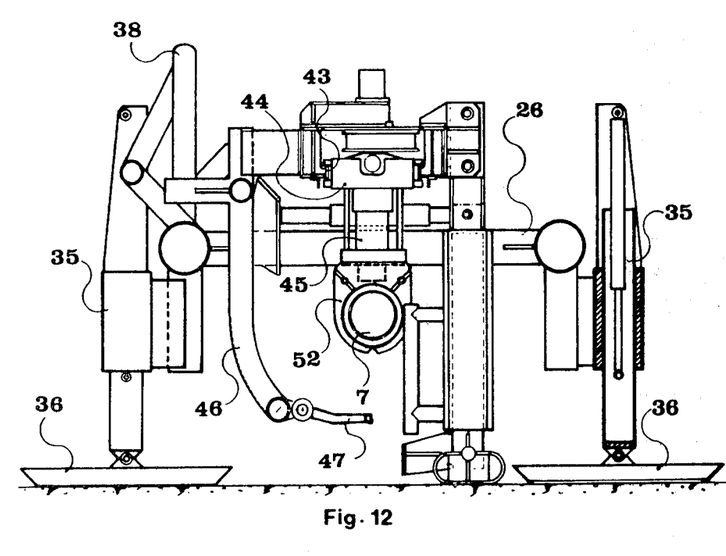
FIG. 12 shows a section along the lines 12a—12a and 12b—12b of FIG. 10.
Figure 13:
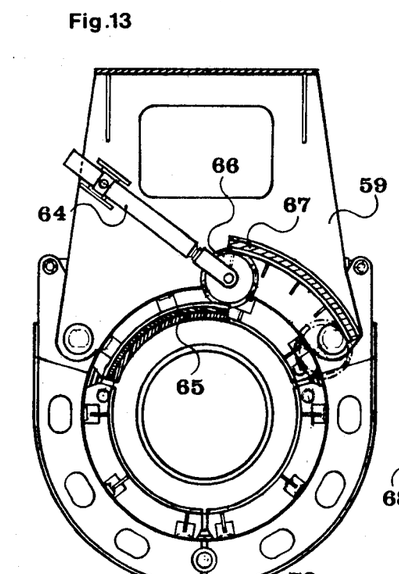
FIG. 13 being a cross-section along the line 13—13 of FIG. 16.
Figure 14:
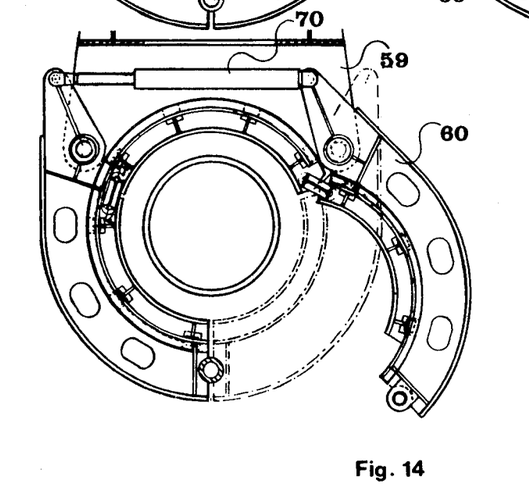
FIG. 14 being a cross-section along the line 14—14 of FIG. 16.
Figure 15:
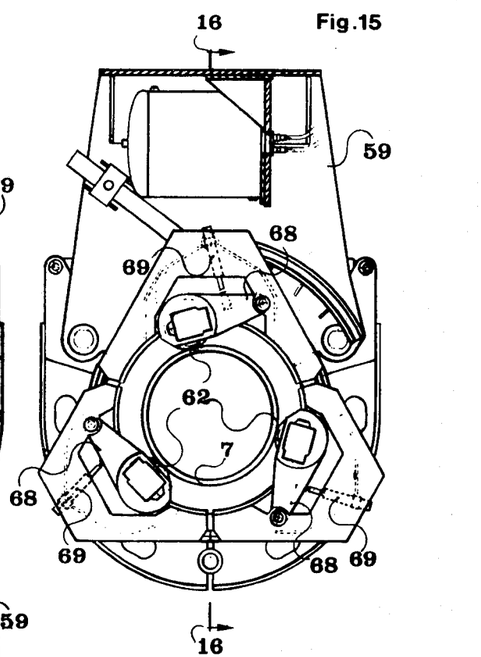
Figure 16:
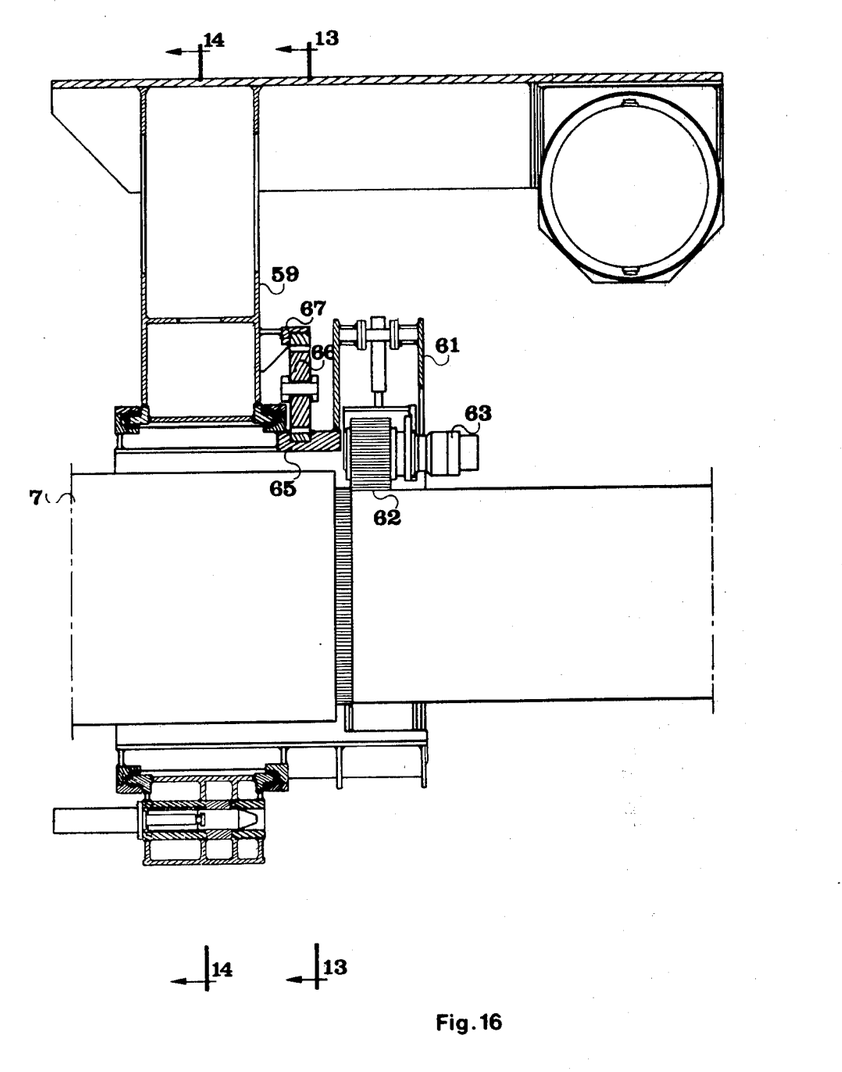
FIG. 16 being a section along the line 16—16 of FIG. 15.

The clamp 39 is carried by a V-shaped piece 42 which ensures excellent alignment of the platform with the axis of the portion of pipe 7. The upstream guide 40 is located above this clamp 39 and it can pivot about a vertical axis which, because of the alignment obtained by the clamp 39, intersects the axis of the portion of pipe 7.

The girder 27 possesses a longitudinal rolling track 43 on which a carriage 44 slides, which carriage is equipped in its lower part with a stage to which a tool-carrier 45 is attached, for example by screwing, while a cage 46, comprising vertical elements equipped towards the bottom with a retractable system 47 for recovering shells of concrete, protects the tool-carrier during the lowering of the girder onto the platform 26.

The girder possesses rough guiding elements 48 (FIG. 10) cooperating with the guides 38 of the platform 26 to provide rough guiding, an element for girder/pipe alignment 49 which is applied against the portion of pipe 7, an upstream precise guiding element 50 and a downstream precise guiding element 51, engaging respectively with the upstream guide 40 and the downstream guide 41 of the platform 26, and an auxiliary clamp 52 for engaging the portion of pipe 7. The upstream element 50 permits a certain rotation about a horizontal axis of the girder 27, relative to the platform 26, and, as already stated, the guide 40 can rotate about a vertical axis, while, downstream, a jack 53 permits horizontal displacement of the girder and a jack 54 permits vertical displacement of the latter, so that, before taking up its exact position defined by the auxiliary clamp 52, the girder 27 can pivot, for example with a maximum movement of about $+1.5°$ in the vertical plane and in the horizontal plane, about an imaginary upstream fulcrum 71, the position of which, relative to the pipe 7, is defined by the clamp 39. The final position of the girder 27 is thus strictly parallel to that of the portion of pipe 7 or 9 above which it it placed. It is maintained by an upstream lock 55 and a downstream lock 56.

The tool-carriers can move longitudinally because of the longitudinal displacement of the carriage 44. This displacement is carried out in this case by means of a pulley-jack 57 with a chain or cable 58.

One of the advantages of the above described arrangement is that it makes it possible to use tool-carriers in which a plurality of tools of the same type work simultaneously. Preferably, three tools are mounted in the tool-carriers for concrete stripping, external brushing and precise cutting, and only two tools are mounted in the tool-carriers for internal brushing, for reasons of bulk.

It suffices to show a tool-carrier for external brushing, by way of example, in FIGS. 13 to 16, the design of the other tool-carriers easily being deduced therefrom.

This tool-carrier comprises a support 59 which is attached to the lower part of the carriage 44, for example by being screwed to a stage of the latter, an opening ring 60, controlled by a jack 70, which encloses the portion of pipe 7 or 9, and a cage 61 which carries the tools, in this case three brushes 62 driven by hydraulic motors 63, and which is displaced in a rotational movement along an approximately 120° sector by a jack 64 acting on a movable rack 65 via a toothed wheel 66 rolling over a fixed rack 67.

The tools 62 are mounted so as to float in the cage 61, by means of arms 68, actuated by jacks 69, for applying these tools 62 against the portion of pipe.

These embodiments are obviously only given by way of illustration, it being possible to adopt numerous modifications and adaptations to the particular cases of use, without going outside the scope of the invention.

What is claimed is:

1. A process for tapping a region of a submerged pipe, comprising the steps of:
    engaging a portion of a submerged pipe by at least one lifting device;
    displacing said pipe portion in vertical and horizontal directions using said lifting device;
    installing a working platform above a tapping region of said pipe;
    attaching a modular tool-carrier to a support girder;

lowering said support girder having said modular tool-carrier attached thereto onto said working platform;

conducting an operation on said pipe portion using said modular tool-carrier, said operation being one of a plurality of operations consisting of stripping concrete from said pipe portion, stripping an anti-corrosion covering from said pipe portion, making a final cut in said pipe portion, fettling said final cut, internally brushing said pipe portion over a predetermined length, and making a longitudinal weld of said pipe portion flush;

raising said support girder to a water surface;

removing said modular tool-carrier from said support girder;

placing an additional modular tool-carrier on said support girder and again lowering said support girder having said additional modular tool-carrier onto said working platform if an additional operation is to be conducted;

repeating said raising, removing, placing, and again lowering steps until all desired operations have been completed.

2. The process as claimed in claim 1, further comprising the step of raising said support girder after said all desired operations have been completed.

3. The process as claimed in claim 2, wherein said pipe is located on a sea bed.

4. A process for preparing confronting ends of a submerged pipe for tapping after two preliminary traverse cuts have been made in said pipe in order to removed a section of said pipe thus forming first and second temporary pipe ends, said preliminary traverse cuts being closer together than intended final traverse cuts, comprising the steps of:

installing a lifting device so that a part thereof is vertically above a first pipe portion terminating at said first temporary pipe end;

installing a working platform vertically above said first temporary pipe end;

attaching a modular tool-carrier to a support girder;

lowering said support girder onto said working platform;

conducting an operation on said first pipe portion, said operation being one of a plurality of operations consisting of stripping concrete from said first pipe portion, stripping an anti-corrosion covering from said first pipe portion, making a final cut in said first pipe portion, fettling said final cut in said first pipe portion, internally brushing said first pipe portion over a predetermined length thereof, and making a longitudinal weld of said first pipe portion flush;

raising said support girder to a water surface; and performing the above steps on said second pipe portion terminating at said second temporary pipe end.

5. The process as claimed in claim 4, wherein said pipe is located on a sea bed, said lifting device being placed on said sea bed so that said part thereof is vertically above said first pipe portion, and further comprising the step of displacing said first pipe portion in vertical and horizontal directions prior to installing said working platfrom vertically above said first temporary pipe end.

6. The process as claimed in claim 5, further comprising the steps of engaging and gripping said respective first and second pipe portions with clamps located on said lifting device prior to conducting said operations on said respective first and second pipe portions.

7. The process as claimed in claim 1, further comprising the step of handling and positioning said working platform, said girder, and said lifting device using a lifting beam equipped with orientation means.

8. The process as claimed in claim 4, further comprising the step of handling and positioning said working platform, said girder, and said lifting device using a lifting beam equipped with orientation means.

9. The process as claimed in claim 4, wherein an ovalisation measurement is made along said pipe prior to making said two preliminary traverse cuts, and further comprising the step of determining a location of said intended final traverse cuts and said installation location of said working platform from said ovalisation measurement of said pipe.

10. The process as claimed in claim 9, wherein acoustic buoys are installed on said first and second pipe portions and on a pipe portion which is severed from said first and second pipe portions by said two preliminary cuts prior to making said two preliminary traverse cuts.

11. The process as claimed in claim 4, further comprising the step of controlling said lifting device using a light tapping device equipped with means for being displaced between a sea surface and a sea bed.

12. The process as claimed in claim 11, further comprising the step of controlling said working platform with said light tapping device.

13. The process as claimed in claim 11, further comprising the step of controlling clamps for gripping said first and second pipe portions with said light tapping device.

14. An apparatus for preparing confronting ends of a submerged pipe for tapping after two preliminary traverse cuts have been made in said pipe in order to remove a section of said pipe thus forming first and second temporary pipe ends, said temporary pipe ends being closer together than intended final traverse cuts to be made in said pipe, comprising:

means for engaging and lifting a first portion of said pipe terminating at said first temporary pipe end, said engaging and lifting means including means for displacing said first pipe portion in vertical and horizontal directions while in contact with a floor;

a support girder;

a working platform including means for engaging a pipe while in contact with said floor, said support girder being selectively received on said working platform and being selectively locked thereto;

said support girder being provided with means for receiving any one of a plurality of tool-carriers, each of said tool-carriers carrying tools required to carry out an operation, said operation being one of a plurality of operations consisting of stripping concrete from said first pipe portion, stripping and anti-corrosion covering from said first pipe portion, making a final cut in said first pipe portion, fettling said final cut in said first pipe portion, internally brushing said first pipe portion over a predetermined length, and making a longitudinal weld of said first pipe portion flush, said tool-carriers including means for being removably attached to said support girder; and handling and control means adapted to be displaced between a water surface and said floor for handling and controlling said engaging and lifting means, said support girder, and said working platform.

15. The apparatus as claimed in claim 14, wherein said handling and control means displaces said support girder between said water surface and said floor subsequent to each operation performed by any one of said plurality of tool-carriers so that another one of said plurality of tool-carriers can be received by said support girder.

16. The apparatus as claimed in claim 15, wherein said engaging and lifting means comprising two columns resting on two feet, a girder whose height is adjustable by being slid on said two columns, a plurality of jaws, and a carriage slidable along said girder and carrying said jaws.

17. The apparatus as claimed in claim 15, wherein said handling and control means comprise a lifting beam equipped with orientation means, and a light tapping device.

18. The apparatus as claimed in claim 15, wherein said working platform includes a plurality of feet having an adjustable height, said height adjustment being sufficient to enable some of said feet to pass over said first pipe portion while the other of said feet remain on said floor; and an aligning system capable of aligning said pipe with said working platform.

19. The apparatus as claimed in claim 15, wherein said working platform comprises a frame which defines a central opening, first lateral guide means for roughly guiding said support girder during its lowering onto said platform, and second guide means located at longitudinal ends of said platform for insuring precise final guiding of said support girder.

20. The apparatus as claimed in claim 15, wherein said support girder includes a protective cage for protecting said modular tool-carrier, said cage being located at a lower part of said support girder and extending vertically, a lower part of said cage including a removable system for allowing a portion of a pipe to pass therethrough.

21. The apparatus as claimed in claim 15, wherein said working platform and said support girder are provided at their longitudinal ends with reciprocal connecting means which form a ball-and-socket system at one end and a vertically and horizontally adjustable guide at the other longitudinal end, and means for locking said connecting means.

22. The apparatus as claimed in claim 21, wherein said working platform pipe engaging means are located vertically above said connecting means forming said ball-and-socket system, and said support girder comprises means for engaging said first pipe portion which are located near said other end remote from said one end where said ball-and-socket connecting system is located.

23. The apparatus as claimed in claim 15, wherein said support girder comprises a longitudinal rolling track having a slidable carriage thereon, said carriage being provided in its lower part with means for receiving said modular tool-carriers.

24. The apparatus as claimed in claim 23, wherein at least some of said tool-carriers comprise a cage in which several tools of a same type are mounted, each of said several tools being rotatable over a pipe sector which substantially corresponds to a proportionate share of a circumference of said pipe.

25. The apparatus as claimed in claim 24, wherein some of said several tools are mounted to float in said cage.

* * * * *